United States Patent
Miyazaki et al.

(10) Patent No.: US 7,240,747 B2
(45) Date of Patent: Jul. 10, 2007

(54) LEGGED MOBILE ROBOT LEG STRUCTURE

(75) Inventors: Susumu Miyazaki, Wako (JP); Hideaki Takahashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 612 days.

(21) Appl. No.: 10/416,900

(22) PCT Filed: Nov. 16, 2001

(86) PCT No.: PCT/JP01/10057

§ 371 (c)(1),
(2), (4) Date: Nov. 3, 2003

(87) PCT Pub. No.: WO02/40228

PCT Pub. Date: May 23, 2002

(65) Prior Publication Data

US 2004/0074679 A1 Apr. 22, 2004

(30) Foreign Application Priority Data

Nov. 17, 2000 (JP) ............................. 2000-351743

(51) Int. Cl.
*B62D 51/06* (2006.01)
(52) U.S. Cl. ........................................ 180/8.6; 180/8.1
(58) Field of Classification Search ................ 180/8.5, 180/8.6, 8.1; 318/568.12
See application file for complete search history.

(56) References Cited

U.S. PATENT DOCUMENTS 5,151,859 A 9/1992 Yoshino et al.
5,455,497 A * 10/1995 Hirose et al. .......... 318/568.12
6,831,437 B2 * 12/2004 Filo ...................... 318/568.12
6,897,631 B2 * 5/2005 Miyazaki et al. ...... 318/568.12
6,981,562 B2 * 1/2006 Takahashi .................... 180/8.6

FOREIGN PATENT DOCUMENTS

| EP | 0 406 018 A1 | 1/1991 |
| EP | 0 648 583 B1 | 4/1995 |
| JP | 3-184782 | 8/1991 |
| JP | 7-285085 | 10/1995 |

* cited by examiner

*Primary Examiner*—Tony Winner
(74) *Attorney, Agent, or Firm*—Squires, Sanders & Dempsey L.L.P.

(57) ABSTRACT

A legged mobile robot leg structure is provided in which a lower leg part (24) is connected to the lower end of an upper leg part (23) through a knee joint (27), a foot part (25) having a six-axis force sensor (60) is connected to the lower end of the lower leg part (24) through an ankle joint (28), and the ankle joint (28) supports the foot part (25) so that the foot part (25) can pitch around a lateral axis (Ly) and roll around a fore-and-aft axis (Lx) relative to the lower leg part (24). A pitch motor (34) for making the foot part (25) pitch around the lateral axis (Ly) is supported on the lower leg part (24) at a position above the ankle joint (28), and a roll motor (35) for making the foot part (25) roll around the fore-and-aft axis (Lx) is supported on the lower leg part (24) at a position above the ankle joint (28). The driving force for driving the lower leg part (24) can thereby be reduced by decreasing the moment of inertia around the knee joint (27), and the influence of noise of the motors (34, 35) on the six-axis force sensor (60) provided on the foot part (25) can be minimized.

13 Claims, 7 Drawing Sheets

LEGGED MOBILE ROBOT LEG STRUCTURE

FIELD OF THE INVENTION

The present invention relates to a legged mobile robot leg structure and, in particular, a legged mobile robot leg structure in which a lower leg part is connected through a knee joint to the lower end of an upper leg part, a foot part is connected through an ankle joint to the lower end of the lower leg part, and the ankle joint supports the foot part such that the foot part can pitch and roll relative to the lower leg part.

BACKGROUND ART

Such a legged mobile robot leg structure is known from Japanese Patent Application Laid-open No. 3-184782. In this arrangement, a pitch motor is provided at a position close to the upper end of a lower leg part, and makes a foot part pitch relative to the lower leg part around a pitch shaft via a belt transfer means, and a roll motor is provided on a roll shaft that is perpendicular to the pitch shaft, and makes the foot part roll relative to the lower leg part.

It should be noted here that when the lower leg part is driven relative to an upper leg part, reducing the moment of inertia below a knee joint that connects the upper leg part to the lower leg part can reduce the load on a drive source for driving the lower leg part. In order to reduce the moment of inertia, it is desirable for the position of a heavy object attached to the lower leg part to be as close to the knee joint as possible, but in the above-mentioned arrangement, although the pitch motor, which is a heavy object, is disposed in an upper part of the lower leg part, that is, at a position close to the knee joint, since the roll motor, which is another heavy object, is disposed in a lower part of the lower leg part, that is, at a position far from the knee joint, the moment of inertia below the knee joint cannot be made sufficiently small, which is a problem.

Furthermore, a six-axis force sensor for controlling bipedal walking of the robot is mounted on the foot part, and if the roll motor is provided in a lower part of the lower leg part at a position close to the foot part, then it is necessary to take special measures to alleviate the influence of noise of the roll motor, which is also a problem.

Moreover, since the roll motor is provided in the vicinity of an ankle joint, the position of the ankle joint is raised from a floor surface, the amount of compliance control of the ankle joint is large, and it is therefore difficult to rapidly respond to unexpected unevenness and inclination of the floor surface, which is also a problem.

DISCLOSURE OF THE INVENTION

The present invention has been achieved in view of these circumstances, and an object thereof is to reduce the driving force for driving a lower leg part by decreasing the moment of inertia around a knee joint and, at the same time, minimize the influence of the noise of a motor on a sensor provided on a foot part, and another object thereof is to rapidly respond to unexpected unevenness and inclination of a floor surface by lowering the height of an ankle joint from the floor surface.

In order to attain these objects, in accordance with a first aspect of the present invention, there is proposed a legged mobile robot leg structure in which a lower leg part is connected to the lower end of an upper leg part through a knee joint, a foot part is connected to the lower end of the lower leg part through an ankle joint, and the ankle joint supports the foot part so that the foot part can pitch around a lateral axis and roll around a fore-and-aft axis relative to the lower leg part, the legged mobile robot leg structure including a pitch motor for making the foot part pitch around the lateral axis, the pitch motor being supported on the lower leg part at a position above the ankle joint, and a roll motor for making the foot part roll around the fore-and-aft axis, the roll motor being supported on the lower leg part at a position above the ankle joint.

In accordance with this arrangement, since the pitch motor for making the foot part pitch around the lateral axis and the roll motor for making the foot part roll around the fore-and-aft axis are supported on the lower leg part at positions above the ankle joint, the positions of the pitch motor and the roll motor, which are heavy, are close to the knee joint, and as a result, the moment of inertia of the lower leg part around the knee joint can be decreased, thereby reducing the load imposed on the drive source for driving the knee joint.

Furthermore, in accordance with a second aspect of the present invention, in addition to the arrangement of the first aspect, there is proposed a legged mobile robot leg structure that includes a pitch shaft supported on the lower leg part such that the pitch shaft can rotate around the lateral axis, a pitch belt transfer means for transferring rotation of an output shaft of the pitch motor to the pitch shaft, the output shaft being disposed in the direction of the lateral axis, and a roll mechanism for rollably supporting the foot part on the pitch shaft.

In accordance with this arrangement, since the foot part is rollably supported via the roll mechanism on the pitch shaft supported on the lower leg part such that it can rotate around the lateral axis, and the pitch shaft is driven via the pitch belt transfer means for transferring the rotation of the output shaft of the pitch motor to the pitch shaft, rotating the pitch shaft can make the roll mechanism and the foot part pitch as a unit, and operating the roll mechanism can make the foot part roll relative to the pitch shaft, thereby preventing pitching and rolling of the foot part from interfering with each other.

Moreover, in accordance with a third aspect of the present invention, there is proposed a legged mobile robot leg structure in which a lower leg part is connected to the lower end of an upper leg part through a knee joint, a foot part is connected to the lower end of the lower leg part through an ankle joint, and the ankle joint supports the foot part so that the foot part can pitch around a lateral axis and roll around a fore-and-aft axis relative to the lower leg part, the legged mobile robot leg structure including a pitch shaft and a roll shaft that are fixed so as to be perpendicular to each other and that rotate around the lateral axis and the fore-and-aft axis respectively, a rotating member that is rotatably supported on the outer periphery of one of the pitch shaft and the roll shaft and that rotates integrally with the foot part, a first drive source that rotates the other one of the pitch shaft and the roll shaft, a drive bevel gear coaxially disposed within said other one of the pitch shaft and the roll shaft, a driven bevel gear coaxially disposed within said one of the pitch shaft and the roll shaft, the driven bevel gear meshing with the drive bevel gear and being connected to the rotating member, and a second drive source for rotating the drive bevel gear.

In accordance with this arrangement, since the rotating member integral with the foot part is rotatably supported on the outer periphery of one of the pitch shaft and the roll shaft that are fixed so as to be perpendicular to each other, the drive bevel gear coaxially disposed within the other one of the pitch shaft and the roll shaft meshes with the driven bevel gear coaxially disposed within said one of the pitch shaft and the roll shaft and connected to the rotating member, said other one of the pitch shaft and the roll shaft is rotated by the first drive source, and the drive bevel gear is rotated by the second drive source, pitching and rolling of the foot part can be carried out independently without interfering with each other. Moreover, since the positions of the pitch shaft and the roll shaft can be lowered, compliance control of the ankle joint can be achieved with a smaller amount of control, thereby enabling stable walking by rapidly responding to unexpected unevenness and inclination of the floor surface.

Furthermore, in accordance with a fourth aspect of the present invention, there is proposed a legged mobile robot leg structure in which a lower leg part is connected to the lower end of an upper leg part through a knee joint, a foot part is connected to the lower end of the lower leg part through an ankle joint, and the ankle joint supports the foot part so that the foot part can pitch around a lateral axis and roll around a fore-and-aft axis relative to the lower leg part, the legged mobile robot leg structure including a roll mechanism for rollably supporting the foot part on a pitch shaft, the roll mechanism including a roll shaft fixed to the pitch shaft so as to be perpendicular thereto, a roll member integrally fixed to the foot part and rotatably supported on the outer periphery of the roll shaft, a drive bevel gear coaxially disposed within the pitch shaft, a roll belt transfer means for transferring rotation of an output shaft of a roll motor to the drive bevel gear, the output shaft being disposed in the direction of the lateral axis, and a driven bevel gear coaxially disposed within the roll shaft, the driven bevel gear meshing with the drive bevel gear and being connected to the roll member.

In accordance with this arrangement, since the roll member integrally having the foot part is rotatably supported on the outer periphery of the roll shaft that is fixed so as to be perpendicular to the pitch shaft, and the rotation of the output shaft of the roll motor is transferred to the roll member via the roll belt transfer means, the drive bevel gear coaxially disposed within the pitch shaft, and the driven bevel gear coaxially disposed within the roll shaft, the foot part can be made to roll independently without interfering with pitching of the foot part, and the foot part can be freely made to pitch while the foot part is rolling. Moreover, since the positions of the pitch shaft and the roll shaft can be lowered, compliance control of the ankle joint can be achieved with a smaller amount of control, thereby enabling stable walking by rapidly responding to unexpected unevenness and inclination of the floor surface.

Moreover, in accordance with a fifth aspect of the present invention, in addition to the arrangement of the fourth aspect, there is proposed a legged mobile robot leg structure, wherein a pitch reduction gear is disposed between a pitch belt transfer means and the pitch shaft, and a roll reduction gear is disposed between the driven bevel gear and the roll member.

In accordance with this arrangement, since the pitch reduction gear is disposed between the pitch belt transfer means and the pitch shaft, the load imposed on a pitch motor can be reduced, and since the roll reduction gear is disposed between the driven bevel gear and the roll member, the load imposed on the roll motor can be reduced.

Furthermore, in accordance with a sixth aspect of the present invention, in addition to the arrangement of the fourth or fifth aspect, there is proposed a legged mobile robot leg structure, wherein the outside of the roll member is covered by a partially spherical cover, and a predetermined gap is formed between the partially spherical cover and the lower end of a skeleton-forming lower leg link of the lower leg part.

In accordance with this arrangement, since a predetermined gap is formed between the partially spherical cover covering the outside of the roll member and the lower end of the lower leg link, it is possible to prevent a large gap from being formed between the partially spherical cover and the lower leg link even when the foot part pitches and rolls, thereby effectively preventing foreign object from being trapped.

Moreover, in accordance with a seventh aspect of the present invention, in addition to the arrangement of the sixth aspect, there is proposed a legged mobile robot leg structure, wherein the partially spherical cover has the center thereof on the pitch shaft or the roll shaft.

In accordance with this arrangement, since the partially spherical cover has its center on the pitch shaft or the roll shaft, the gap that is formed between the partially spherical cover and the lower leg link when the foot part pitches or rolls is kept constant and the partially spherical cover is prevented from interfering with the lower leg link, thus increasing the movable range of the ankle joint while further effectively preventing foreign object from being trapped.

Furthermore, in accordance with an eighth aspect of the present invention, in addition to the arrangement of any one of the first to seventh aspects, there is proposed a legged mobile robot leg structure, wherein a sensor for detecting a load imposed on the foot part is provided on the foot part.

In accordance with this arrangement, since the positions of the pitch motor and the roll motor are far from the foot part, the sensor provided on the foot part is less affected by the noise of the motors, thereby improving detection accuracy.

A pitch motor 34 and a roll motor 35 in an embodiment form respectively the first drive source and the second drive source of the present invention; a roll member 46 of the embodiment forms the rotating member of the present invention; an inner partially spherical cover 62 and an outer partially spherical cover 63 of the embodiment form the partially spherical cover of the present invention; and a six-axis force sensor 60 of the embodiment forms the sensor of the present invention.

BRIEF DESCRIPTION OF THE DRAWINGS

FIG. 1 to FIG. 7 show one embodiment of the present invention;

BEST MODE FOR CARRYING OUT THE INVENTION

An embodiment of the present invention is explained below by reference to the attached drawings.

Figure 1:
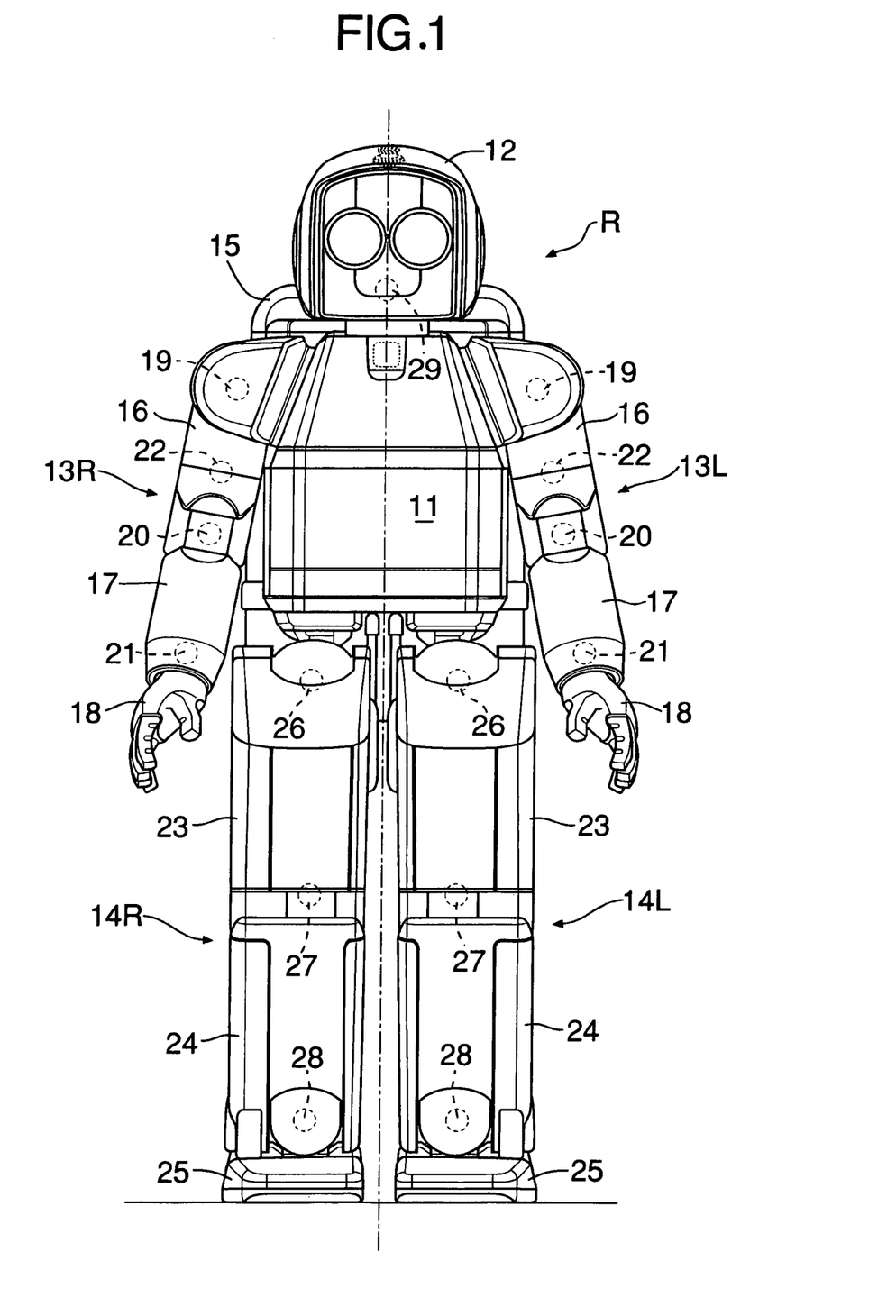
FIG. 1 is a front view of a legged mobile robot.
Figure 2:
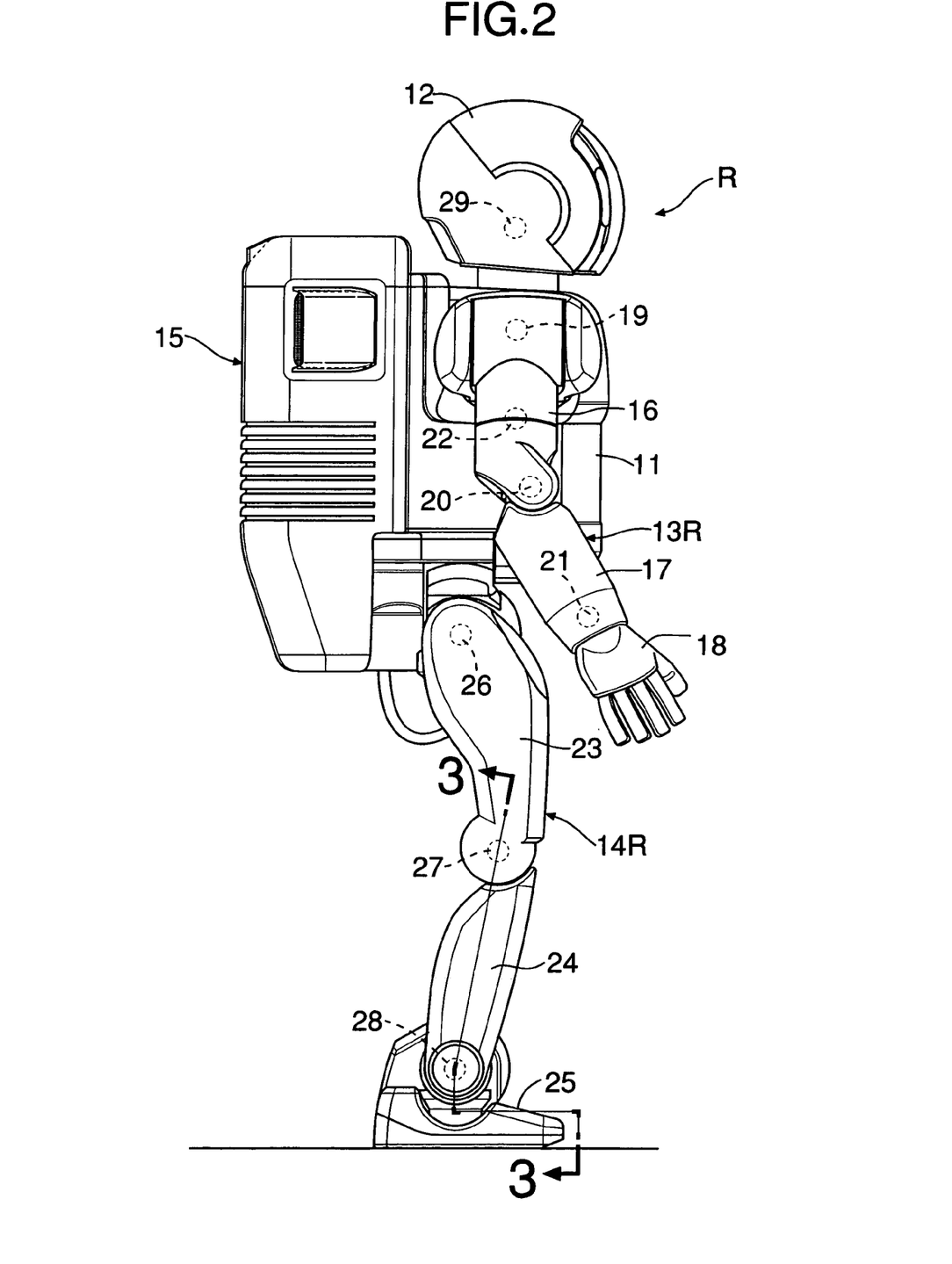
FIG. 2 is a right side view of the legged mobile robot.

As shown in FIG. 1 and FIG. 2, an independent, bipedal walking legged mobile robot R includes a body 11, a head 12, a left arm 13L, a right arm 13R, a left leg 14L, and a right leg 14R, and carries on the back of the body 11 an electrical equipment box 15 housing electrical equipment. Each of the left arm 13L and the right arm 13R is formed form an upper arm part 16, a lower arm part 17, and a hand part 18; the body 11 and the upper arm part 16 are connected together through a shoulder joint 19; the upper arm part 16 and the lower arm part 17 are connected together through an elbow joint 20; the lower arm part 17 and the hand part 18 are connected together through a wrist joint 21; and an upper arm joint 22 is further provided in a longitudinally middle section of the upper arm part 16 for twisting a lower half of the upper arm part 16 relative to an upper half thereof. Moreover, each of the left leg 14L and the right leg 14R is formed from an upper leg part 23, a lower leg part 24, and a foot part 25; the body 11 and the upper leg part 23 are connected together through a hip joint 26; the upper leg part 23 and the lower leg part 24 are connected together through a knee joint 27; and the lower leg part 24 and the foot part 25 are connected together through an ankle joint 28. Furthermore, the body 11 and the head 12 are connected together through a neck joint 29. Only the positions of the above-mentioned joints are shown by broken circles.

The structure of the right leg 14R of the robot R is now explained by reference to FIG. 3 to FIG. 5. Since the left leg 14L and the right leg 14R have mirror symmetric structures, duplicate explanation is omitted.

The upper leg part 23 and the lower leg part 24 are connected together through the knee joint 27 having an axis L and are driven by a drive source (not illustrated) via a belt transmission means 31 and a reduction gear 32. The lower leg part 24 includes a skeleton-forming lower leg link 33, a pitch motor 34 is supported in an upper end part of the lower leg link 33 so that an output shaft 34a of the pitch motor 34 is disposed in the direction of a lateral axis Ly, and a roll motor 35 is supported in a middle part of the lower leg link 33 so that an output shaft 35a of the roll motor 35 is disposed in the direction of the lateral axis Ly.

Figure 3:
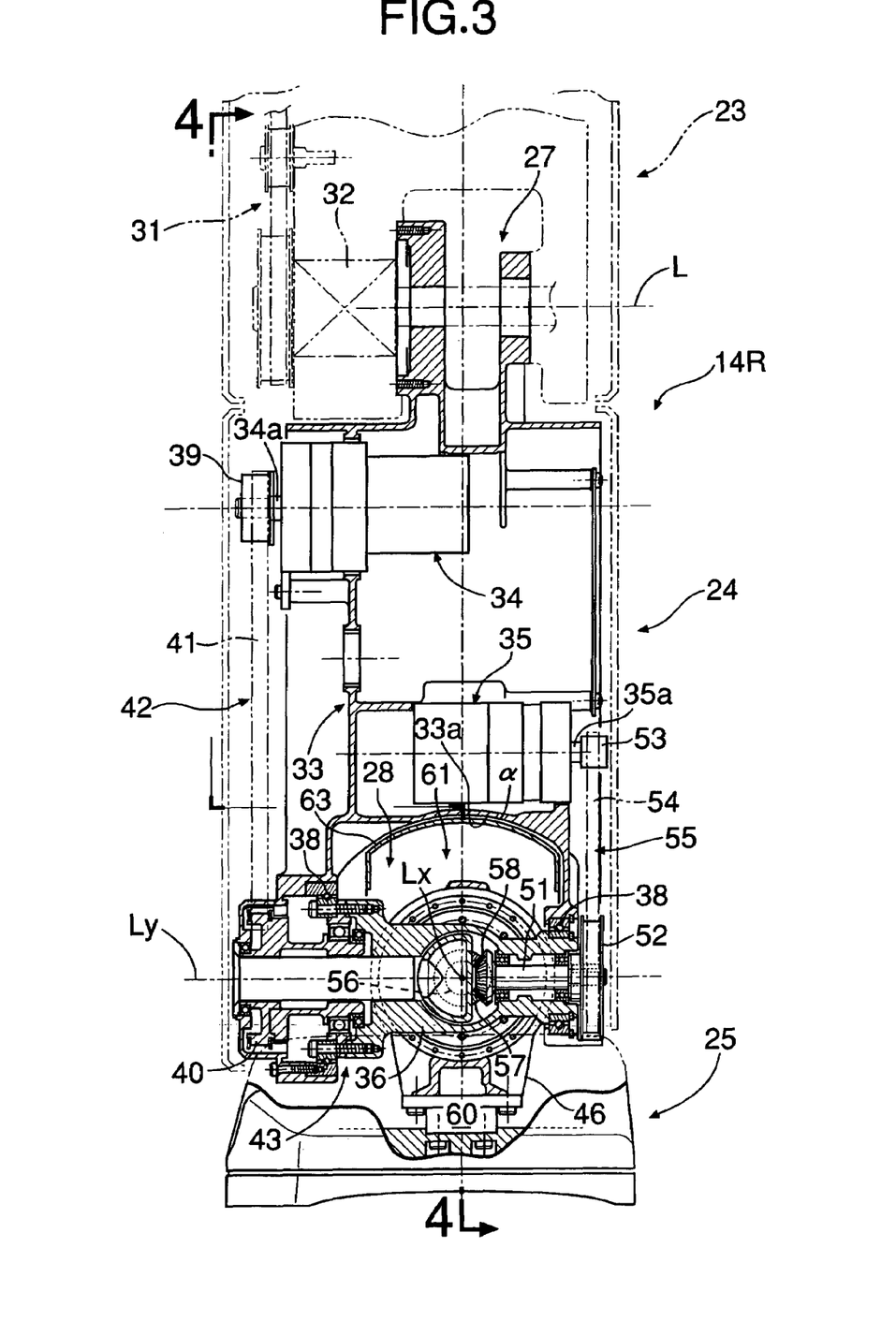
FIG. 3 is a magnified cross section along line 3—3 in FIG. 2 (a cross section along line 3—3 in FIG. 4)

A pitch shaft 36 is rotatably supported on the lower end of the lower leg link 33 via a pair of cross roller bearings 38 and 38 on the lateral axis Ly (see FIG. 3). A drive pulley 39 provided on the output shaft 34a of the pitch motor 34 and a driven pulley 40 disposed on the lateral axis Ly are connected together via an endless belt 41. The drive pulley 39, the driven pulley 40, and the endless belt 41 form a pitch belt transfer means 42. The driven pulley 40 and the pitch shaft 36 are connected together via a pitch reduction gear 43, which is formed of a known harmonic decelerator (product name). The harmonic decelerator reduces the speed of rotation of an input member and outputs it to a coaxially disposed output member, and can be replaced with a planetary gear type reduction gear.

Figure 4:
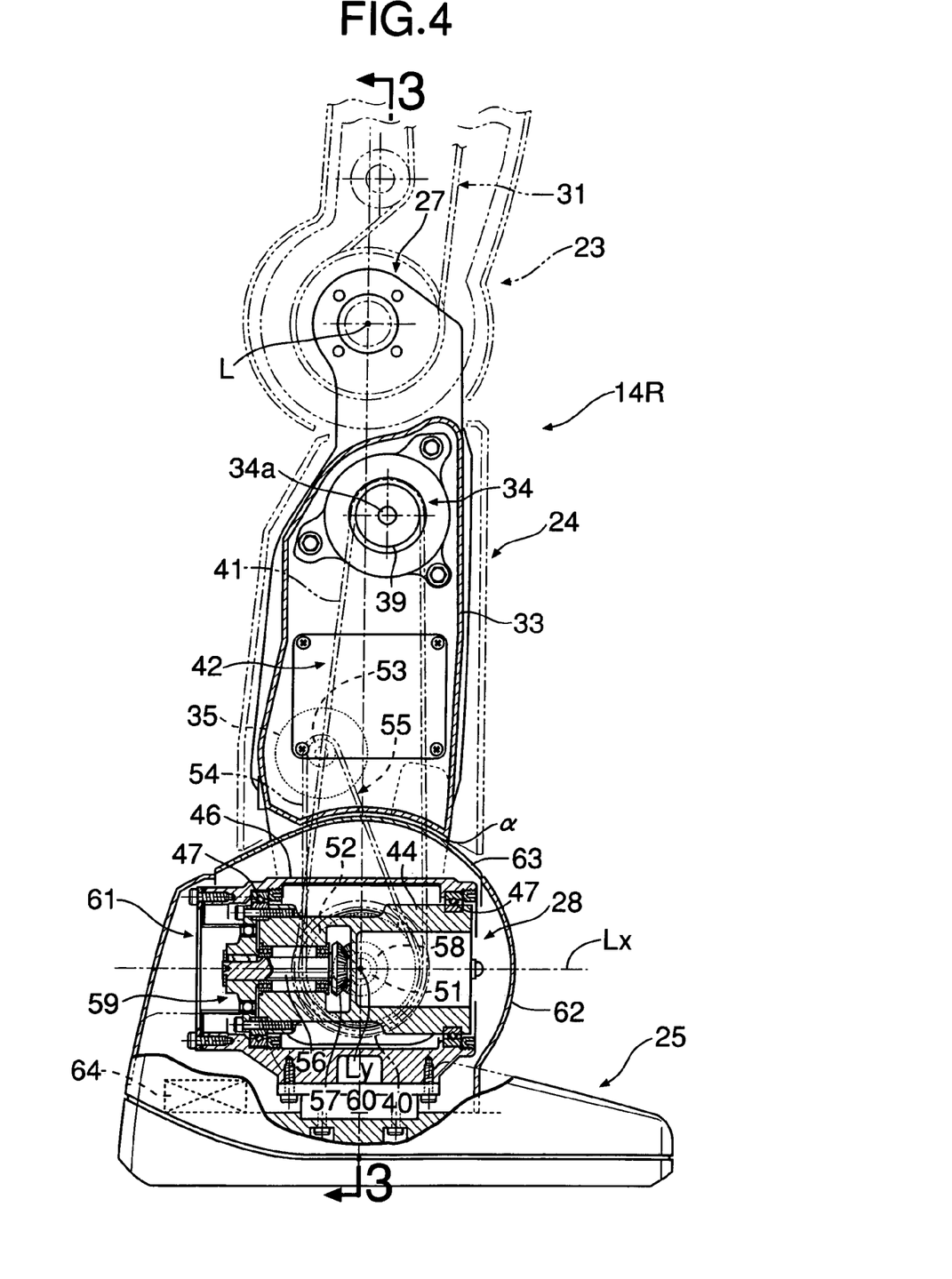
FIG. 4 is a cross section along line 4—4 in FIG. 3.

Formed integrally on the pitch shaft 36 is a roll shaft 44 extending in a direction (fore-and-aft axis Lx) perpendicular to the pitch shaft 36 (see FIG. 4). A tubular roll member 46 is support on the outer periphery of the roll shaft 44 via a pair of cross roller bearings 47 and 47, and the foot part 25 is fixed to this roll member 46.

A driven pulley 52 is fixed to one shaft end of a drive bevel gear shaft 51 that is relatively rotatably supported within the pitch shaft 36. A drive pulley 53 is fixed to the output shaft 35a of the roll motor 35 and is connected to the driven pulley 52 via an endless belt 54. The drive pulley 53, the driven pulley 52, and the endless belt 54 form a roll belt transfer means 55. A driven bevel gear shaft 56 is relatively rotatably supported within the roll shaft 44, which is formed integrally with the pitch shaft 36. A driven bevel gear 57 is provided on one shaft end of the driven bevel gear shaft 56 and meshes with a drive bevel gear 58 that is provided on the other shaft end of the drive bevel gear shaft 51. The other shaft end of the driven bevel gear shaft 56 and the roll member 46 are connected together by a roll reduction gear 59, which is formed of a harmonic reduction gear. Provided on the upper surface of a central section of the foot part 25, in order to make the robot R walk on two feet, is a six-axis force sensor 60 for detecting 6 component forces (loads in three orthogonal axial directions and moments around the three axes) that act on the foot part 25. Provided on the upper surface of a rear part of the foot part 25 is an amplifier 64 for the six-axis force sensor 60.

A roll mechanism 61 for making the foot part 25 roll relative to the pitch shaft 36 is formed from the roll shaft 44, the roll member 46, the drive bevel gear shaft 51, the drive bevel gear 58, the driven bevel gear shaft 56, the driven bevel gear 57, and the roll belt transfer means 55.

Figure 5:
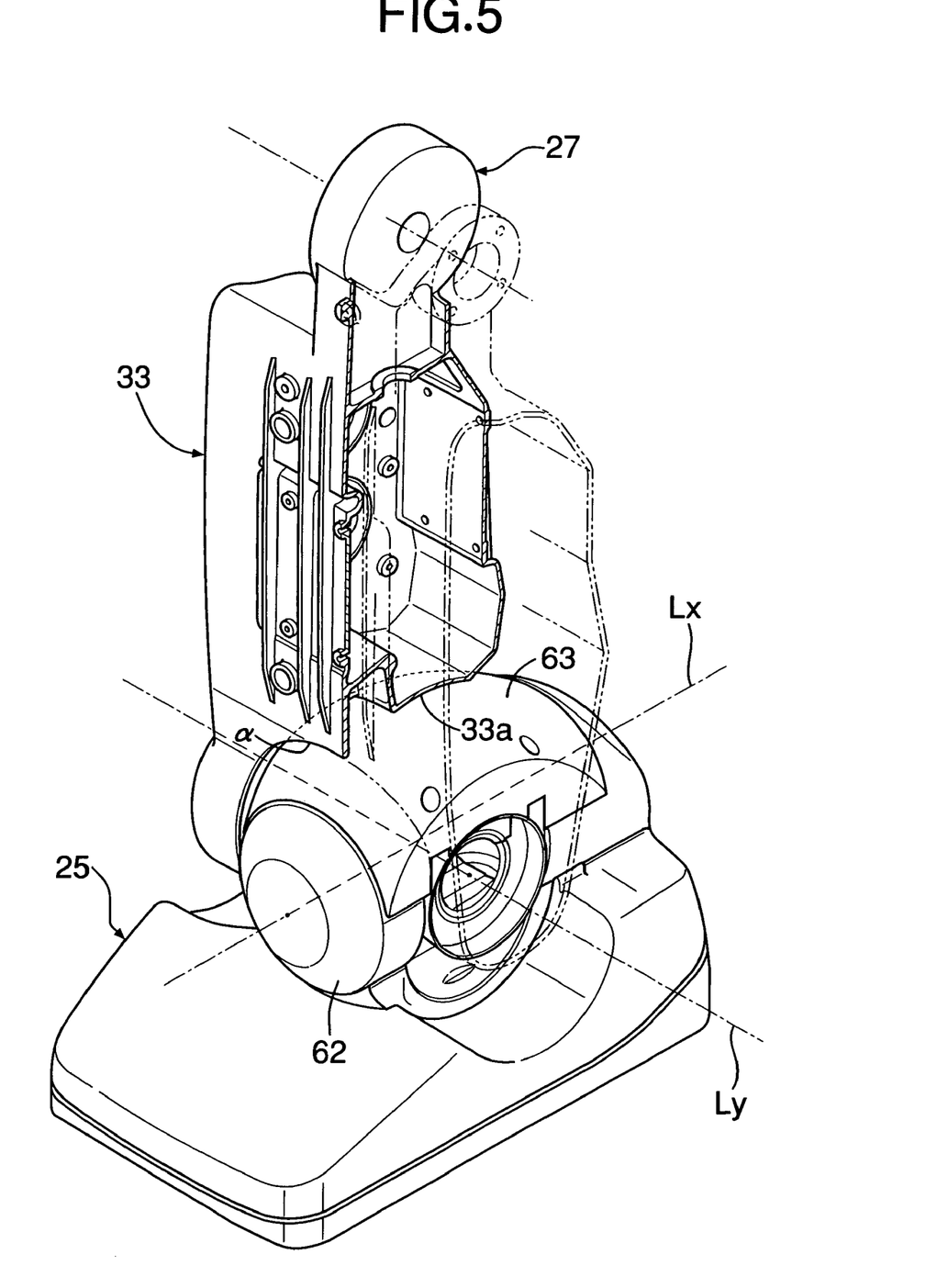
FIG. 5 is a perspective view of a lower leg part and a foot part.
Figure 6:
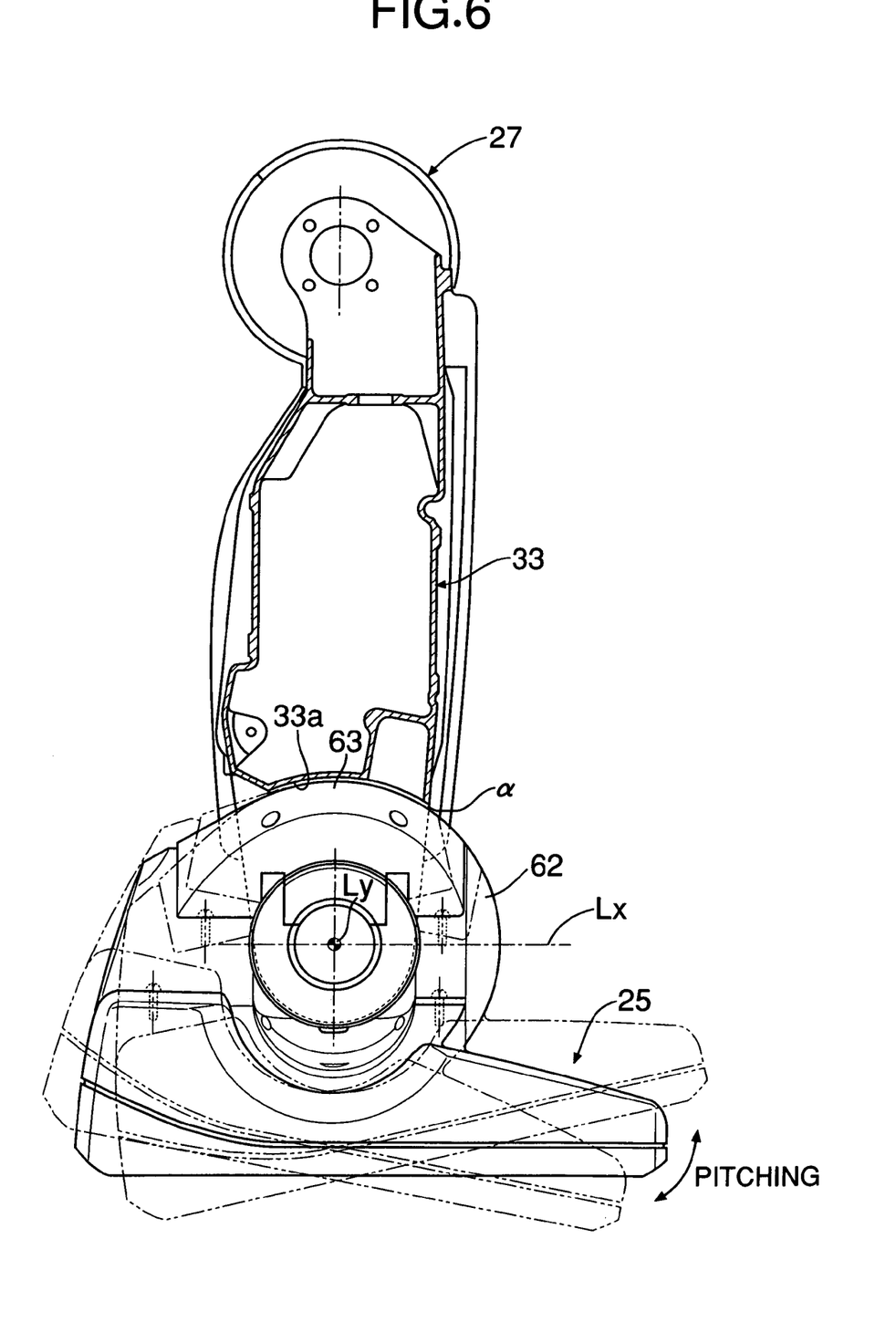
FIG. 6 is a diagram for explaining a pitching action of the foot part.
Figure 7:
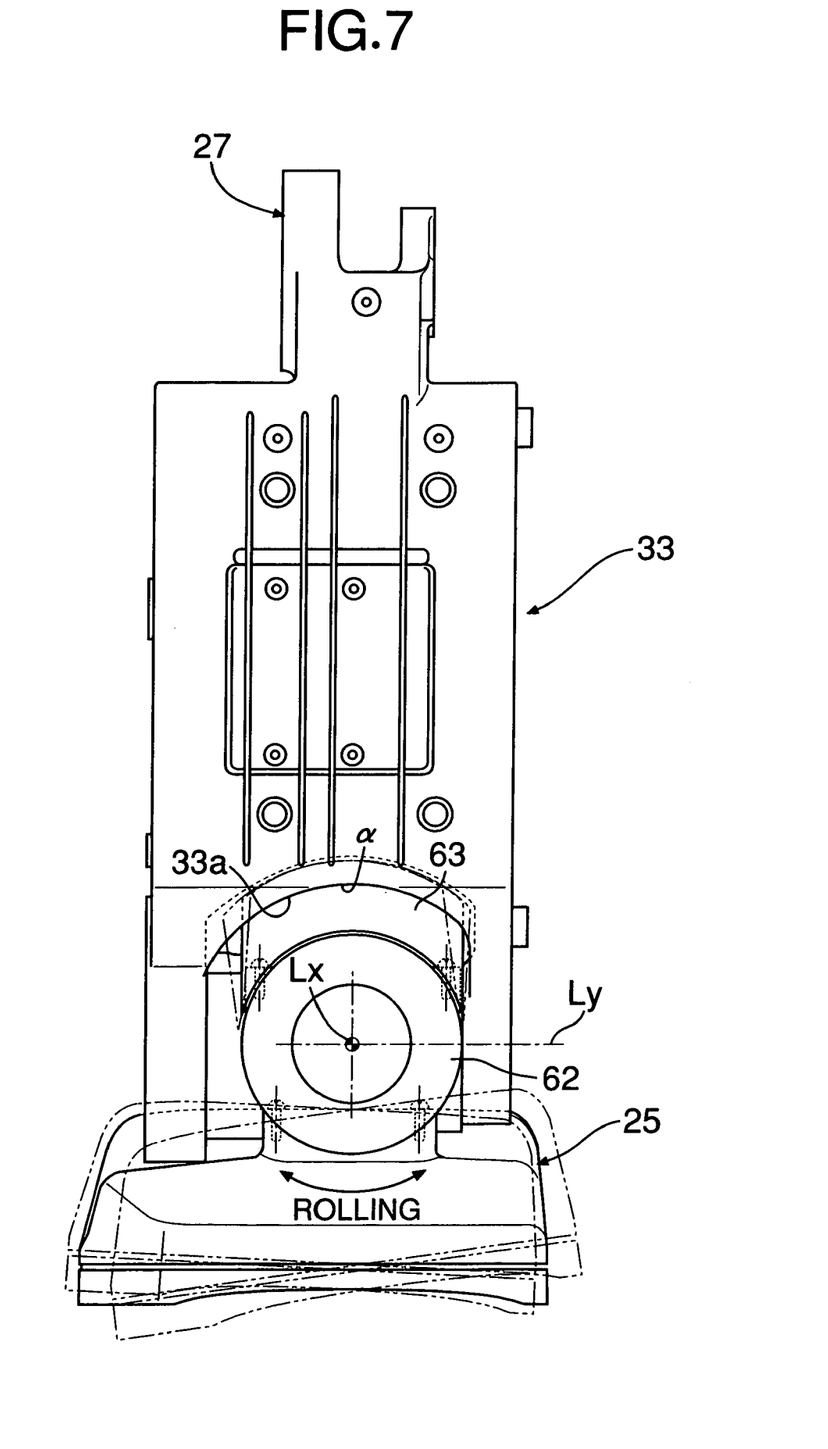
FIG. 7 is a diagram for explaining a rolling action of the foot part.

As is clear by referring to FIG. 5 to FIG. 7, the ankle joint 28 that supports the foot part 25 so that it can pitch and roll relative to the lower leg part 24 includes an inner, partially spherical cover 62 and an outer, partially spherical cover 63 that form a part of concentric spherical surfaces having their centers at the point of intersection of the fore-and-aft axis Lx and the lateral axis Ly. The inner, partially spherical cover 62 is fixed to the roll member 46, whereas the outer, partially spherical cover 63 is fixed to the pitch shaft 36. As a result, when the foot part 25 pitches around the lateral axis Ly, the inner, partially spherical cover 62 and the outer, partially spherical cover 63 pitch as a unit, and when the foot part 25 rolls around the fore-and-aft axis Lx, only the inner, partially spherical cover 62 rolls relative to the outer, partially spherical cover 63. Even when the outer, partially spherical cover 63 and the inner, partially spherical cover 62 rotate relative to each other, since the inner, partially spherical cover 62 has a shape that is substantially rotationally symmetric relative to the fore-and-aft axis Lx, the partial sphere formed from the outer, partially spherical cover 63 and the inner, partially spherical cover 62 will have no step or gap. A concave spherical surface 33a is formed on the lower end of the lower leg link 33, and a minute and uniform gap a is formed between this concave spherical surface 33a and the outer peripheral surfaces of the outer, partially spherical cover 63 and the inner, partially spherical cover 62.

The operation of the embodiment of the present invention having the above-mentioned arrangement is now explained.

When the pitch motor 34 is activated in order to make the foot part 25 pitch around the lateral axis Ly, the foot part 25 being connected through the ankle joint 28 to the lower end of the lower leg part 24 of the robot R, rotation of the output shaft 34a is transferred to the pitch reduction gear 43 via the drive pulley 39, the endless belt 41, and the driven pulley 40 of the pitch belt transfer means 42. The pitch reduction gear 43 reduces the speed of rotation thus input, and outputs it to the pitch shaft 36. The pitch shaft 36 rotating together with the integral roll shaft 44 around the lateral axis Ly makes the foot part 25 pitch around the lateral axis Ly, the foot part 25 being supported on the roll shaft 44 via the roll member 46. In this way, even when the pitch shaft 36 rotates, since the drive bevel gear shaft 51 of the roll mechanism 61 is coaxially and relatively rotatably disposed within the pitch shaft 36, keeping the roll motor 35 in a state in which it can turn freely can prevent the foot part 25 from rolling unnecessarily.

When the roll motor 35 is activated in order to make the foot part 25 roll around the fore-and-aft axis Lx, rotation of the output shaft 35a of the roll motor 35 is transferred to the drive bevel gear shaft 51 via the drive pulley 53, the endless belt 54, and the driven pulley 52 of the roll belt transfer means 55. The rotation of the drive bevel gear shaft 51 changes its direction through 90° via the drive bevel gear 58, the driven bevel gear 57, and the driven bevel gear shaft 56, is then transferred to the roll member 46 via the roll reduction gear 59, and makes the foot part 25 roll, the foot part 25 being integral with the roll member 46. In this way, since the roll mechanism 61 is supported on the pitch shaft 36 so as to pitch integrally with the foot part 25, and the foot part 25 is made to roll relative to the pitch shaft 36 by operating the roll mechanism 61 independently, pitching and rolling will not interfere with each other, nor will they be mixed, and pitch and roll control of the foot part 25 can be simplified.

Furthermore, since the pitch motor 34 and the roll motor 35 are supported on the lower leg part 24 at positions above the ankle joint 28, the positions of the pitch motor 34 and the roll motor 35, which are heavy, are close to the knee joint 27. As a result, the moment of inertia of the lower leg part 24 around the knee joint 27 can be decreased, and the load imposed on the drive source for driving the knee joint 27 can be reduced. Moreover, since the positions of the pitch motor 34 and the roll motor 35 are far from the six-axis force sensor 60 provided on the foot part 25, the six-axis force sensor 60 is less affected by noise of the pitch motor 34 and the roll motor 35, thereby improving detection accuracy.

Furthermore, this arrangement of the pitch motor 34 and the roll motor 35 can lower the positions of the pitch shaft 36 and the roll shaft 44, thereby achieving compliance control of the ankle joint 28 with a smaller amount of control. This enables stable walking by rapidly responding to unexpected unevenness and inclination of a floor surface.

Moreover, when the foot part 25 pitches, since the inner, partially spherical cover 62 and the outer, partially spherical cover 63, which have their centers at the point of intersection of the lateral axis Ly and the fore-and-aft axis Lx, rotate as a unit, the gap a between the two covers 62, 63 and the concave spherical surface 33a of the lower end of the lower leg link 33 can be kept constant, thereby preventing foreign object from being trapped. Furthermore, when the foot part 25 rolls, the inner, partially spherical cover 62 rotates relative to the outer, partially spherical cover 63, but the gap a does not change, thereby also preventing foreign object from being trapped. Moreover, since the gap a does not change, the inner, partially spherical cover 62 and the outer, partially spherical cover 63 are less likely to interfere with the lower leg link 33, thereby increasing the movable range of the ankle joint 28.

Although an embodiment of the present invention is described in detail above, the present invention can be modified in various ways without departing from the spirit and the scope thereof.

For example, in the embodiment, the roll member 46 to which the foot part 25 is integrally fixed is rotatably supported on the outer periphery of the roll shaft 44, the drive bevel gear 58 coaxially disposed within the pitch shaft 36 meshes with the driven bevel gear 57 coaxially disposed within the roll shaft 44 and connected to the roll member 46, and the foot part 25 is made to pitch by rotating the pitch shaft 36 by means of the pitch motor 34, and is made to roll by rotating the drive bevel gear 58 by means of the roll motor 35. It is also possible to rotatably support a pitch member (corresponding to the rotating member of claim 3 of the present invention), to which a foot part 25 is integrally fixed, on the outer periphery of a pitch shaft 36, make a drive bevel gear 58 coaxially disposed within a roll shaft 44 mesh with a driven bevel gear 57 coaxially disposed within the pitch shaft 36 and connected to the pitch member, rotate the roll shaft 44 by means of the roll motor 35 so as to make the foot part 25 roll, and rotate the drive bevel gear 58 by means of a pitch motor 34 so as to make the foot part pitch.

Furthermore, in the embodiment, the load imposed on the foot part 25 is detected by the six-axis force sensor 60, but this can be substituted by a sensor that can detect 3 component forces to 5 component forces.

INDUSTRIAL APPLICABILITY

As hereinbefore described, since the legged mobile robot according to the present invention can walk independently and bipedally, it can be used for attractions and demonstrations.

What is claimed is:

1. A legged mobile robot leg structure in which a lower leg part (24) is connected to the lower end of an upper leg part (23) through a knee joint (27), a foot part (25) is connected to the lower end of the lower leg part (24) through an ankle joint (28), and the ankle joint (28) supports the foot part (25) so that the foot part (25) can pitch around a lateral axis (Ly) and roll around a fore-and-aft axis (Lx) relative to the lower leg part (24), the legged mobile robot leg structure comprising:
a pitch motor (34) for making the foot part (25) pitch around the lateral axis (Ly), the pitch motor (34) being supported on the lower leg part (24) at a position above the ankle joint (28); and
a roll motor (35) for making the foot part (25) roll around the fore-and-aft axis (Lx), the roll motor (35) being supported on the lower leg part (24) at a position above the ankle joint (28).

2. The legged mobile robot leg structure according to claim 1, further comprising:
a pitch shaft (36) supported on the lower leg part (24) such that the pitch shaft (36) can rotate around the lateral axis (Ly);
a pitch belt transfer means (42) for transferring rotation of an output shaft (34a) of the pitch motor (34) to the pitch shaft (36), the output shaft (34a) being disposed in the direction of the lateral axis (Ly); and
a roll mechanism (61) for rollably supporting the foot part (25) on the pitch shaft (36).

3. The legged mobile robot leg structure according to claim 2 wherein a sensor (60) for detecting a load imposed on the foot part (25) is provided on the foot part (25).

4. The legged mobile robot leg structure according to claim 1 wherein a sensor (60) for detecting a load imposed on the foot part (25) is provided on the foot part (25).

5. A legged mobile robot leg structure in which a lower leg part (24) is connected to the lower end of an upper leg part (23) through a knee joint (27), a foot part (25) is connected to the lower end of the lower leg part (24) through an ankle joint (28), and the ankle joint (28) supports the foot part (25) SO that the foot part (25) can pitch around a lateral axis (Ly) and roll around a fore-and-aft axis (Lx) relative to the lower leg part (24), the legged mobile robot leg structure comprising:

a pitch shaft (36) and a roll shaft (44) that are fixed so as to be perpendicular to each other and that rotate around the lateral axis (Ly) and the fore-and-aft axis (Lx) respectively;

a rotating member (46) that is rotatably supported on the outer periphery of one of the pitch shaft (36) and the roll shaft (44) and that rotates integrally with the foot part (25);

a first drive source (34) that rotates the other one of the pitch shaft (36) and the roll shaft (44);

a drive bevel gear (58) coaxially disposed within said other one of the pitch shaft (36) and the roll shaft (44);

a driven bevel gear (57) coaxially disposed within said one of the pitch shaft (36) and the roll shaft (44), the driven bevel gear (57) meshing with the drive bevel gear (58) and being connected to the rotating member (46); and a second drive source (35) for rotating the drive bevel gear (58).

6. The legged mobile robot leg structure according to claim 5 wherein a sensor (60) for detecting a load imposed on the foot part (25) is provided on the foot part (25).

7. A legged mobile robot leg structure in which a lower leg part (24) is connected to the lower end of an upper leg part (23) through a knee joint (27), a foot part (25) is connected to the lower end of the lower leg part (24) through an ankle joint (28), and the ankle joint (28) supports the foot part (25) so that the foot part (25) can pitch around a lateral axis (Ly) and roll around a fore-and-aft axis (Lx) relative to the lower leg part (24), the legged mobile robot leg structure comprising:

a roll mechanism (61) for rollably supporting the foot part (25) on a pitch shaft (36), the roll mechanism (61) comprising:

a roll shaft (44) fixed to the pitch shaft (36) so as to be perpendicular thereto, a roll member (46) integrally fixed to the foot part (25) and rotatably supported on the outer periphery of the roll shaft (44);

a drive bevel gear (58) coaxially disposed within the pitch shaft (36);

a roll belt transfer means (55) for transferring rotation of an output shaft (35a) of a roll motor (35) to the drive bevel gear (58), the output shaft (35a) being disposed in the direction of the lateral axis (Ly); and a driven bevel gear (57) coaxially disposed within the roll shaft (44), the driven bevel gear (57) meshing with the drive bevel gear (58) and being connected to the roll member (46).

8. The legged mobile robot leg structure according to claim 7 wherein a pitch reduction gear (43) is disposed between a pitch belt transfer means (42) and the pitch shaft (36), and a roll reduction gear (59) is disposed between the driven bevel gear (57) and the roll member (46).

9. The legged mobile robot leg structure according to claim 8 wherein a sensor (60) for detecting a load imposed on the foot part (25) is provided on the foot part (25).

10. The legged mobile robot leg structure according to either claim 7 or 8 wherein the outside of the roll member (46) is covered by a partially spherical cover (62, 63), and a predetermined gap (□) is formed between the partially spherical cover (62, 63) and the lower end of a skeleton-forming lower leg link (33) of the lower leg part (24).

11. The legged mobile robot leg structure according to claim 10 wherein the partially spherical cover (62, 63) has the center thereof on the pitch shaft (36) or the roll shaft (44).

12. The legged mobile robot leg structure according to claim 11 wherein a sensor (60) for detecting a load imposed on the foot part (25) is provided on the foot part (25).

13. The legged mobile robot leg structure according to claim 7 wherein a sensor (60) for detecting a load imposed on the foot part (25) is provided on the foot part (25).

* * * * *